Dec. 8, 1925.
G. W. EMRICK
1,564,768
CHUCK
Original Filed Dec. 29, 1920
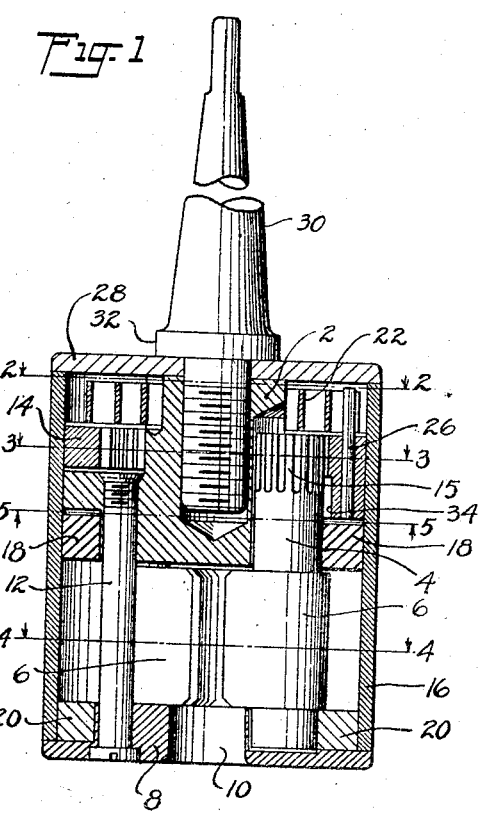
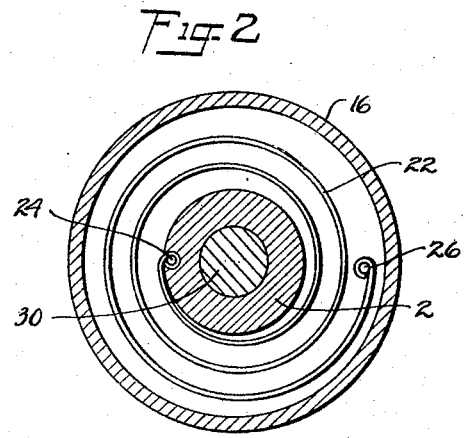
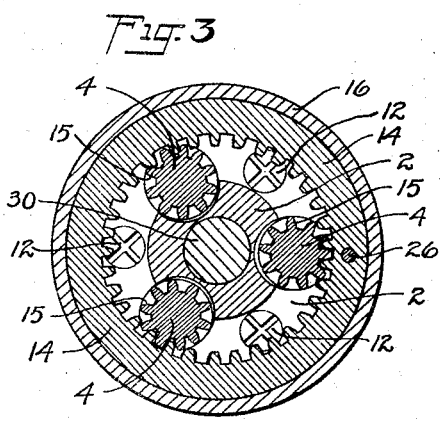
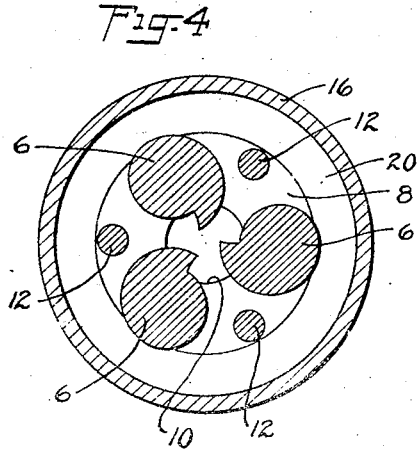
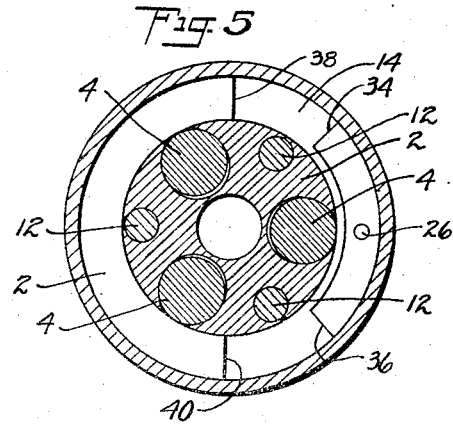
Inventor
George W. Emrick
By His Attorneys
Newell & Spencer Patented Dec. 8, 1925.

1,564,768

UNITED STATES PATENT OFFICE.

GEORGE W. EMRICK, OF BROOKLYN, NEW YORK, ASSIGNOR TO EASTERN TUBE AND TOOL COMPANY, OF BROOKLYN, NEW YORK, A CORPORATION OF NEW YORK.

CHUCK.

Application filed December 29, 1920, Serial No. 433,755. Renewed October 29, 1925.

*To all whom it may concern:*

Be it known that I, GEORGE W. EMRICK, a citizen of the United States, residing at Brooklyn, in the county of Kings and State of New York, have invented certain new and useful Improvements in Chucks, of which the following is a clear, full, and exact description.

This invention relates to tool holding chucks for use in drilling or boring devices or machines, lathes and similar machines.

The primary objects of the invention are to improve the construction and mode of operation of tool holding chucks and to produce a chuck which is easily and quickly operable to release or clamp a tool, which is inexpensive to manufacture, is not subject to excessive wear or distortion and the parts of which may be readily assembled.

With these objects in view a chuck having one or more movable tool clamping members may be provided with an actuating member or sleeve rotatable about the axis of the chuck to actuate the tool clamping members to clamp a tool or to initiate the tool clamping action or to release a tool, and the inventor contemplates as a feature of the invention, the provision of one or more freely rotatable bearing rings upon which the actuating member or sleeve is rotatably mounted. The provision of this feature greatly reduces friction and enables the actuating member to be very easily and rapidly operated. The inventor further contemplates as an important feature of the invention the provision, in combination with tool clamping members mounted upon shafts which are rotated to actuate the clamping members to clamp and release the tool of one or more freely rotatable bearing rings arranged to engage the shafts so as to take the side thrust thereof produced by the clamping of a tool. These rings, because of their freely rotatable arrangement, will shift their points of contact with the shafts not only when tools of different sizes are clamped but also in clamping different tools of the same size, thus reducing wear and distortion to a minimum.

The invention also comprises other novel and improved features which enable the parts to be cheaply manufactured, which result in a reduction of wear on the parts and which enable the chuck to withstand in a reliable manner the heavy strains thereon.

The invention will be clearly understood from the accompanying drawings illustrating the invention in its preferred form and the following detailed description of the constructions therein shown.

In the drawings—

Fig. 1 is a view in axial section of a chuck embodying the invention.

Fig. 2 is a sectional view taken substantially on the line 2—2 of Fig. 1.

Fig. 3 is a sectional view taken substantially on the line 3—3 of Fig. 1.

Fig. 4 is a sectional view taken substantially on the line 4—4 of Fig. 1, and

Fig. 5 is a sectional view taken substantially on the line 5—5 of Fig. 1.

The chuck embodying the preferred form of the invention as illustrated in the drawing comprises a head 2 provided with a series of bearing bores in which respectively are journaled the upper ends of shafts 4 which carry tool clamping cams 6 rigidly mounted thereon, the cams being preferably formed integral with the shafts.

The lower ends of the several shafts 4 engage in bearing bores in a cap 8 secured to the head 2 and having an opening 10 through which the shank of a tool may be inserted between the tool clamping cams. The head 2 and the cap 8 are preferably secured together by means of a series of screws 12 extending preferably parallel with the axes of the shafts 4, these screws passing through openings in the cap 8 and being threaded into the head 2.

The clamping cams 6 preferably are rotated in unison to clamp initially and to release the shank of a tool placed between the cams. The means for rotating the cams in the construction shown comprises a rotatable gear ring 14 having internal teeth which mesh with a series of gear teeth 15 formed at the upper end of each of the shafts 4. The gear ring 14 is rigidly secured within a rotatable sleeve or shell 16 surrounding the head 2 and the cap 8 and mounted to rotate about the axis of these parts.

During a drilling or boring operation the rotation of the chuck against the resistance exerted by the shank of the tool on the tool clamping cams tends to turn and does often turn the cam slightly in a direction to clamp the tool more tightly. The action is a rolling one and exerts a heavy thrust on the cam carrying shafts in a direction radially of the chuck which would enlarge and wear out the bearings for the shafts in the head and cap if it were taken on the same. In the present form of the invention, however, the bores in the head 2 and the cap 8 are not cylindrical, but are enlarged radially of the chuck so that the cam carrying shafts 4 have a slight amount of radial play in the same, the shafts being carried outwardly slightly by the initial tool clamping action. The bearing bores for the shafts 4 in the head and cap are located so that they cut through the peripheries of these parts, as clearly shown in Fig. 5. To take the outward or radial thrust on the cam carrying shafts 4, two bearing rings 18 and 20 encircle the upper and lower ends of the shafts and are arranged to be engaged by the shafts as the shafts are carried outwardly by the initial tool clamping action of the chuck. These bearing rings are mounted to rotate freely about the axis of the chuck and in clamping successive tools they will shift about the axis of the chuck and thus vary their points of engagement with the shafts not only in clamping tools of varying sizes, but also in clamping successive tools of the same size. Thus the wear on the rings will be distributed about the inner circumferential surfaces of the rings. In the particular construction shown, the rings are mounted to rotate freely on suitable bearing portions formed respectively on the head 2 and cap 8 and are held in place laterally of the rings by shouldered portions of the head and cap, and by the cams 6.

In the present embodiment of the invention, to enable the sleeve 16 to rotate with as little friction as possible so that it will operate easily, the sleeve is mounted to rotate about the two freely rotatable bearing rings 18 and 20 which are free to rotate with relation to the sleeve, the outer surfaces of the rings constituting bearings for the sleeve.

The sleeve 16 preferably is rotated relatively to the other parts of the chuck about the axis of the chuck in a direction to cause the clamping cams to clamp initially a tool located between the same by means of a suitable spring. In the present form of the invention the sleeve is rotated in this direction by means of a spiral spring 22, one end of which is attached to a pin 24 secured in the head 2 and the other end of which is attached to a pin 26 mounted in the gear ring 14. The sleeve may be rotated manually in the opposite direction to actuate the clamping cams to release a tool.

The upper end of the shell 16 is closed by a cap 28 which is held in place by a shank member 30 threaded into the head 2 and having a collar 32 engaging the cap.

With the above construction in inserting a tool in the chuck, the sleeve 16 is grasped by the operator and the sleeve and the other parts of the chuck are turned relatively to cause the clamping cams to recede from each other. The tool is then inserted between the clamping cams and the sleeve is released whereupon the spring 22 will turn the sleeve on the chuck to cause the clamping cams to clamp initially the tool. To release a tool during the normal rotation of the chuck, the operator merely grasps the sleeve and checks the rotation thereof, the rotation of the other parts of the chuck relatively to the sleeve actuating the clamping cams to release the tool.

To limit the movement of the sleeve 16 in both directions with relation to the head 2, a projecting portion of the gear ring 14 is formed with stops 34 and 36 which engage respectively stops 38 and 40 formed on the head.

In the above chuck construction the provision of the freely rotatable bearing rings 18 and 20 reduces wear due to the outward thrust on the cam carrying shafts produced by the tool clamping action of the chuck to a minimum and enables the sleeve 16 to rotate with very little friction.

It is important that in a chuck of this character the head and cap should line up accurately and run true. The screws 12 which preferably have long bearings in the head and cap insure the accurate lining up of the head and cap and the true running of the same. These screws receive a large part of the uneven side thrusts to which the parts of the chuck are subjected during a drilling operation and will withstand the same in a reliable manner. In actual practice it has been found of advantage to make these screws of a relatively strong stiff material such as drill rod steel to withstand the strains thereon.

The chuck illustrated in the drawing also has the advantage that its parts may be manufactured comparatively cheaply and may be quickly and easily assembled. In assembling the parts of the chuck as preferably performed, the head 2, the shafts and cam members 4 and 6, bearing ring 18, cap 8 and bearing ring 20 are first assembled and secured together as a unit, after which the sleeve 16 with gear ring 14, spring 22, cap 28 and shank member 30 are applied to the parts thus assembled. In assembling the parts of the chuck in this manner the bearing ring 18 is applied to the head 2, the shafts 4 are inserted in the bearing bores in said head, the bearing ring 20 is applied to the cap 8 and the shafts 4 are inserted in the bearing bores in the cap. The head and cap may then be conveniently secured together by means of the screws 12, to hold the head and cap together, the screws, however, not being tightened at this time. After the securing together of the head and cap, the sleeve 16 with the gear ring secured to the inside thereof, is applied over the assembled parts. The cap 28 is then placed in position and the shank member 30 is threaded into the head 2. Before the shank member is tightened, however, a thin temporary spacer is placed between the cap 28 and the adjacent end of sleeve 16. The shank member 30 is then screwed home after which the screws 12 are adjusted tight. The shank member 30, cap 28, temporary spacer and sleeve 16 are then removed and the upper ends of the screws 12 are preferably upset to hold the adjustment of the screws. This upsetting of the screws also will prevent the screws from becoming loose during the use of the chuck and will prevent the head and cap from being readily taken apart. After the upsetting of the screws, the sleeve 16 with attached gear ring 14, is again placed in position, the spiral spring 22 is inserted, the cap 28 is applied and the shank member 30 is inserted in the head and screwed tight.

The use of the temporary spacer between the sleeve 16 and cap 28 in the manner described enables the screws 12 to be readily adjusted so that the clamping cams 6 will turn easily between the head 2 and cap 8 and also so that the sleeve 16 will rotate freely between caps 8 and 28. This freedom of movement of the parts will be insured even with considerable variation in size or shape of certain of the parts so that these parts need not be manufactured with the accuracy usually required in a device of this character.

It is to be understood that the invention is not limited to the particular construction and arrangement of parts of the illustrated embodiment thereof but that the invention may be embodied in other forms within the scope of the claims.

What I claim as new is:

1. A chuck having in combination a head, a rotary tool clamping member, a shaft journaled in said head upon which said tool clamping member is mounted and a freely rotatable bearing ring engaging said shaft to take the lateral thrust thereof produced by the clamping of a tool.

2. A chuck having in combination a head, a rotary tool clamping member, a shaft journaled in said head upon which said tool clamping member is mounted and two spaced freely rotatable bearing rings engaging the opposite ends of said shaft to take the lateral thrust thereof produced by the clamping of a tool.

3. A chuck having in combination a head, rotary tool clamping cams, shafts journaled in said head upon which said tool clamping cams are mounted and two freely rotatable bearing rings encircling the opposite ends of said shafts and engaging the same to take the outward thrust thereof produced by the clamping of a tool.

4. A chuck having in combination a head, a tool clamping member movably mounted on said head, an actuating member for the clamping member mounted to rotate about the axis of the chuck and a freely rotatable bearing ring upon which said actuating member is rotatably mounted having a substantially cylindrical outer surface forming a bearing for said member and contacting with said member substantially throughout the periphery of the ring.

5. A chuck having in combination a head, rotary tool clamping members, shafts journaled in said head upon which said tool clamping members are mounted, a freely rotatable bearing ring mounted to rotate about said shafts and arranged to take the lateral thrust thereof produced by the clamping of a tool, an actuating sleeve rotatably mounted on said ring and gearing connecting the sleeve and shafts for rotating the shafts by the relative rotation of the sleeve and head.

6. A chuck having in combination a head, rotary tool clamping members, shafts journaled at one end in said head upon which shafts said clamping members are mounted, a freely rotatable bearing ring rotatably mounted on said head and arranged to take the lateral thrust on the adjacent ends of the shafts produced by the clamping of a tool, a cap in which the opposite ends of said shafts are journaled, a freely rotatable bearing ring rotatably mounted on said cap and arranged to take the lateral thrust on the adjacent ends of the shafts produced by the clamping of a tool, an actuating sleeve rotatably mounted on said rings, and gearing connecting the sleeve and shafts for rotating the shafts from the relative rotation of the sleeve and head.

7. A chuck having in combination a head, a rotary tool clamping member, a shaft journaled in said head upon which said tool clamping member is mounted, a freely rotatable bearing ring having a substantially cylindrical outer bearing surface, a rotary sleeve rotatably mounted on said bearing surface of said ring and contacting with the ring substantially throughout the periphery of the ring, and gearing connecting the sleeve and shaft for rotating the shaft.

8. A chuck having in combination a head formed with a bearing, a rotary tool clamping member, a shaft upon which said member is mounted, journaled at one end in said bearing, a cap spaced from said head and having a bearing in which the opposite end of said shaft is journaled, a series of rods for securing the head and cap together as a unit, a rotary actuating sleeve surrounding the head and cap and adapted to be applied after the head, shaft and cap have been assembled and gearing connecting the shaft and sleeve for rotating the shaft from the relative rotation of the head and sleeve.

9. A chuck having in combination a head having a bearing, a rotary tool clamping member, a shaft upon which said member is mounted journaled at one end in said bearing, a series of gear teeth carried by the shaft, a cap spaced from said head and having a bearing in which the opposite end of said shaft is journaled, a series of rods for securing together the head, shaft, clamping member and cap as a unit, a rotary actuating sleeve surrounding the head and cap, and a gear ring secured to the inside of said sleeve and arranged to mesh with the gear teeth carried by said shaft, both adapted to be placed in operating position after the head, shaft, clamping member and cap are assembled.

10. A chuck having in combination a head, having a bearing, a freely rotatable bearing ring rotatably mounted on said head, a rotary tool clamping member, a shaft upon which said tool clamping member is mounted journaled in said head and arranged to engage said bearing ring, a cap having a bearing in which the opposite end of said shaft is journaled, a freely rotatable bearing ring rotatably mounted on said cap and arranged to engage said shaft, means for securing the head, shaft, clamping member, cap and bearing rings together as a unit, a rotary actuating sleeve rotatably mounted on the bearing rings and adapted to be placed in position after the head, shaft, clamping members, cap and bearing rings are assembled, and gearing connecting the sleeve and shaft for turning the shaft from the relative rotation of the sleeve and head.

11. A chuck having, in combination, a head, a series of rotary tool clamping members, shafts journaled in said head upon which said tool clamping members are mounted, and a freely rotatable bearing ring having a bearing surface circular in cross-section for engaging said shafts to take the lateral thrust thereof produced by the clamping of a tool.

12. A chuck having, in combination, a head, a series of rotary tool clamping members, shafts journaled in said head upon which said tool clamping members are mounted, and two spaced independently movable freely rotatable bearing rings engaging the opposite ends of each of said shafts to take the lateral thrust thereof produced by the clamping of a tool.

13. A chuck having, in combination, a head, a series of rotary tool clamping members, shafts each journaled at one end in said head upon which said tool clamping members are mounted, a cap secured to said head having bearings in which the opposite ends of said shafts are journaled, spaced freely rotatable bearing rings encircling the opposite ends of said shafts to take the lateral thrust thereof produced by the clamping of a tool, an actuating sleeve surrounding said head and rotatably mounted on said bearing rings, means on said cap for engaging one end of said sleeve to hold the same in position, a second cap secured to said head for engaging the opposite end of said sleeve for holding the same in position, and gearing connecting the sleeve and said shafts for rotating the shafts by the relative rotation of the sleeve and head.

Signed at New York city this 2nd day of December 1920.

GEORGE W. EMRICK.